United States Patent
Kinnunen et al.

(10) Patent No.: US 9,755,812 B2
(45) Date of Patent: Sep. 5, 2017

(54) SCHEDULING IMPROVEMENT

(71) Applicant: Nokia Solutions and Networks Oy, Espoo (FI)

(72) Inventors: Pasi Eino Tapio Kinnunen, Oulu (FI); Jari Y. Hulkkonen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 59 days.

(21) Appl. No.: 14/641,499

(22) Filed: Mar. 9, 2015

(65) Prior Publication Data
US 2015/0263844 A1 Sep. 17, 2015

Related U.S. Application Data

(60) Provisional application No. 61/950,932, filed on Mar. 11, 2014.

(51) Int. Cl.
*H04L 5/00* (2006.01)
*H04J 11/00* (2006.01)

(52) U.S. Cl.
CPC ........ *H04L 5/0073* (2013.01); *H04J 11/0056* (2013.01); *H04L 5/0032* (2013.01); *H04L 5/0007* (2013.01); *H04L 5/0023* (2013.01)

(58) Field of Classification Search
CPC .................................................. H04L 5/0073
See application file for complete search history.

(56) References Cited

U.S. PATENT DOCUMENTS

| | | | | |
|---|---|---|---|---|
| 2007/0047483 A1* | 3/2007 | Khan | ..................... | H04L 5/0053 370/328 |
| 2010/0216477 A1* | 8/2010 | Ryan | ..................... | H04W 16/04 455/449 |
| 2011/0081865 A1* | 4/2011 | Xiao | ................... | H04W 52/243 455/63.1 |
| 2012/0002632 A1* | 1/2012 | Takagi | .............. | H04W 72/0426 370/329 |

(Continued)

FOREIGN PATENT DOCUMENTS

WO 2013045741 A1 4/2013

OTHER PUBLICATIONS

ETSI; "ETSI TR 103 063 V1.1.1 (Jul. 2011) Technical Report—Reconfigurable Radio Systems (RRS); Use Cases for Reconfigurable Radio Systems operating in IMT bands and GSM bands for intra-operator scenarios"; Jul. 2011; whole document (36 pages).

(Continued)

*Primary Examiner* — Brian D Nguyen
*Assistant Examiner* — Toan Nguyen
(74) *Attorney, Agent, or Firm* — Harrington & Smith

(57) ABSTRACT

In accordance with the exemplary embodiments of the invention there is at least a method and apparatus to perform operations including receiving information including indications of frequency and time of resource usages for a cell of a neighboring cell, wherein the frequency and time resource usages for the cell of the neighboring cell are for a predetermined amount of next frequency and time resource usages scheduled; and processing the received frequency and time resource usages to create a mapping of frequency and time pair usage specific to the neighboring cell.

17 Claims, 6 Drawing Sheets

(56) References Cited

U.S. PATENT DOCUMENTS

| | | | | |
|---|---|---|---|---|
| 2012/0021753 A1* | 1/2012 | Damnjanovic | ..... | H04W 72/082 455/450 |
| 2012/0140706 A1* | 6/2012 | Doppler | ............... | H04J 11/0053 370/328 |
| 2014/0071836 A1* | 3/2014 | Panchal | ............ | H04W 72/1205 370/248 |

OTHER PUBLICATIONS

ETSI; "ETSI TR 102 947 V1.1.1 (Jun. 2013) Technical Report—Reconfigurable Radio Systems (RRS); Use Cases for building and exploitation of Radio Environment Maps (REMs) for intra-operator scenarios"; Jun. 2013; whole document (31 pages).

* cited by examiner

SCHEDULING IMPROVEMENT

CROSS-REFERENCE TO RELATED APPLICATIONS

This patent application claims priority under 35 U.S.C. §119(e) from U.S. Provisional Patent Application No. 61/950,932, filed Mar. 11, 2014, the disclosure of which is incorporated by reference herein in its entirety.

TECHNICAL FIELD

The teachings in accordance with the exemplary embodiments of this invention relate generally to obtaining accurate intersystem interference information to enable optimization of channel traffic and, more specifically, relate to avoiding IMT spectrum interference between systems such as LTE-advanced and GSM systems.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CM cubic metric
CoMP coordinated multipoint
DL downlink
DTX discontinuous transmission
DSR dynamic spectrum refarming
eNodeB evolved node B or E-UTRA nodeB
FDD frequency division duplex
GSM global system for mobile communications
HSPA high-speed downlink packet access
IMT international mobile communications
IR invention report
LTE long term evolution
PRB physical resource block
TDD time division duplex
TDMA time division multiple access
TX transmitter
RAT radio access technology
RNC radio network controller
RX receiver
RRS reconfigurable radio system
SCC secondary component carrier
TDD time division duplex
UE user equipment
UL uplink
WLAN wireless local area network A GSM system is a narrow-band communication system, a bandwidth of which is about 200 kHz. When GSM systems are used to form a cellular network, different frequency points can be used between possibly interfering neighbor cells, so as to avoid co-channel interference. Usually interference from another system, which is not detected by a primary system, may typically be assumed to be white Gaussian noise from own signal point of view. This can be the assumption when different radio technologies cause interference towards each other, for example GSM and LTE. This may be assumed only if there is high enough correlation between used reference symbols (e.g. channel estimation symbols for data or similar critical symbols) and reference symbols used by other radio system. With only these assumptions primary system scheduling itself cannot use directly interference symbols to optimize allocation. Further, only simple averaging of interference levels may be used in such cases for taking account other system interference. However, averaging interference level scheduling is seen to not be optimal.

In addition, averaging interference levels is also used for other system interference or it is expected that there does not exist co-channel interference due to for example system configuration or frequency planning of system. Still another practiced method is to use some filtering of interference to optimize interference level measurement. Disadvantages include that averaging or filtering can't be used for identification of fast and random time domain changes, and this way benefit from those changes, e.g. in case of GSM system. The exemplary embodiments of the invention address at least these and related shortfalls.

SUMMARY

In an exemplary aspect of the invention, there is an apparatus comprising: at least one processor; and at least one memory including computer program code, where the at least one memory and the computer program code are configured, with the at least one processor, to cause the apparatus to at least: receive information comprising indications of frequency and time of resource usages for a cell of a neighboring cell, wherein the frequency and time resource usages for the cell of the neighboring cell are for a predetermined amount of next frequency and time resource usages scheduled; and process the received frequency and time resource usages to create a mapping of frequency and time pair usage specific to the neighboring cell.

In another exemplary aspect of the invention, there is a method comprising: receiving, by a network device, information comprising indications of frequency and time of resource usages for a cell of a neighboring cell, wherein the frequency and time resource usages for the cell of the neighboring cell are for a predetermined amount of next frequency and time resource usages scheduled; and processing the received frequency and time resource usages to create a mapping of frequency and time pair usage specific to the neighboring cell.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose at least a method of mapping time-frequency pairs not used by the secondary component carrier system and/or neighbor cell in order to detect different levels of interference free resources in the secondary component carrier system and/or neighbor cells.

As a general framework, flexible radio resource usage is one key target of Cognitive Radio Networks. There are related activities ongoing in ETSI RRS, like e.g. RRS operation in GSM and IMT bands and usage of Radio Environment Maps. Dynamic Spectrum Re-farming (DSR) is one topic that has been discussed.

In more detail, exemplary embodiments as disclosed herein relates to LTE-Advanced system 3GPP LTE Rel-11 and beyond (FDD/TDD). LTE-Advanced is an evolution of LTE Rel-8 system fulfilling the ITU-R requirements for IMT-Advanced. In addition to LTE-Advanced system focus is also on other similar wireless radio communication systems using spectrum sharing or DSR and PRB allocation by scheduler, signal power estimation, interference power estimation and/or channel estimation for receiving data symbols. Other systems like evolution of WLAN, HSPA and Wimax etc. are in the scope of the embodiments (either applied as secondary user of the spectrum or as an interfering system with features stated in this paper). In one presented use case for the exemplary embodiments is IMT spectrum sharing between LTE-Advanced and GSM systems. Moreover, may be assumed that GSM is primary user of the spectrum and LTE-Advanced is secondary user or part of a neighbor cell of the spectrum. However, this is not limiting to the exemplary embodiments. Interfering system (s) can be also some other system. Such as systems of which resource usage information is known or can be predicted in advance, and informed to e.g. LTE system.

Co-existence of different technologies leads to new intersystem interference situations. For example, different technologies such as 1800 MHz band re-farming from GSM to LTE may result at a future date. A dynamic Spectrum Re-farming feature enables dynamic use of spectrum resources between GSM and LTE. GSM interference characteristics are very different compared to LTE system. The dynamic Spectrum Re-farming feature has been presented for the use case when LTE will be deployed to the current GSM spectrum (especially 1800 MHz band). A current proposal includes a method to estimate inter system interference at a cell level and based on that information adapt with a shared spectrum usage in the neighboring cells. Current proposals aim to minimize buffer areas, or required buffer cells, between GSM and LTE. Furthermore, it has been proposed that a secondary system estimate interference from primary system to be able to use that estimate information for radio resource allocation. Exemplary embodiments of the invention provide a complementary improved method to proposals such as these.

Figure 1:
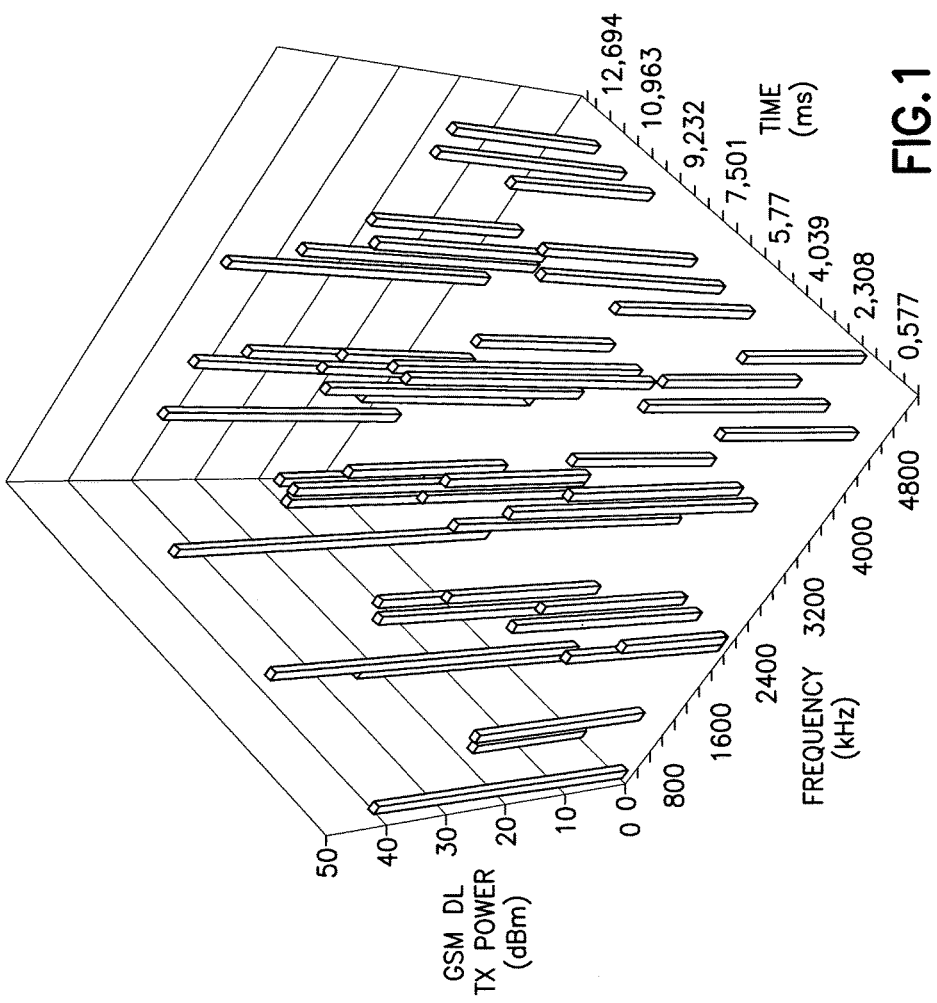
FIG. 1 illustrates a GSM resource usage matrix in a timeslot frequency domain.

As indicated above a GSM carrier may be 200 kHz wide. In addition, GSM system can apply frequency reuse (e.g., with an effective reuse factor typically 3 or higher) and frequency hopping. Therefore, GSM interference towards LTE is seen as involving random high interference peaks. GSM resource usage (=outgoing interference from GSM) in timeslot-frequency matrix as illustrated in FIG. 1. Especially frequency hopping makes GSM interference very difficult to predict. An LTE scheduler aim is to make optimum PRB allocations for a next burst based on the available interference estimation.

Figure 2:
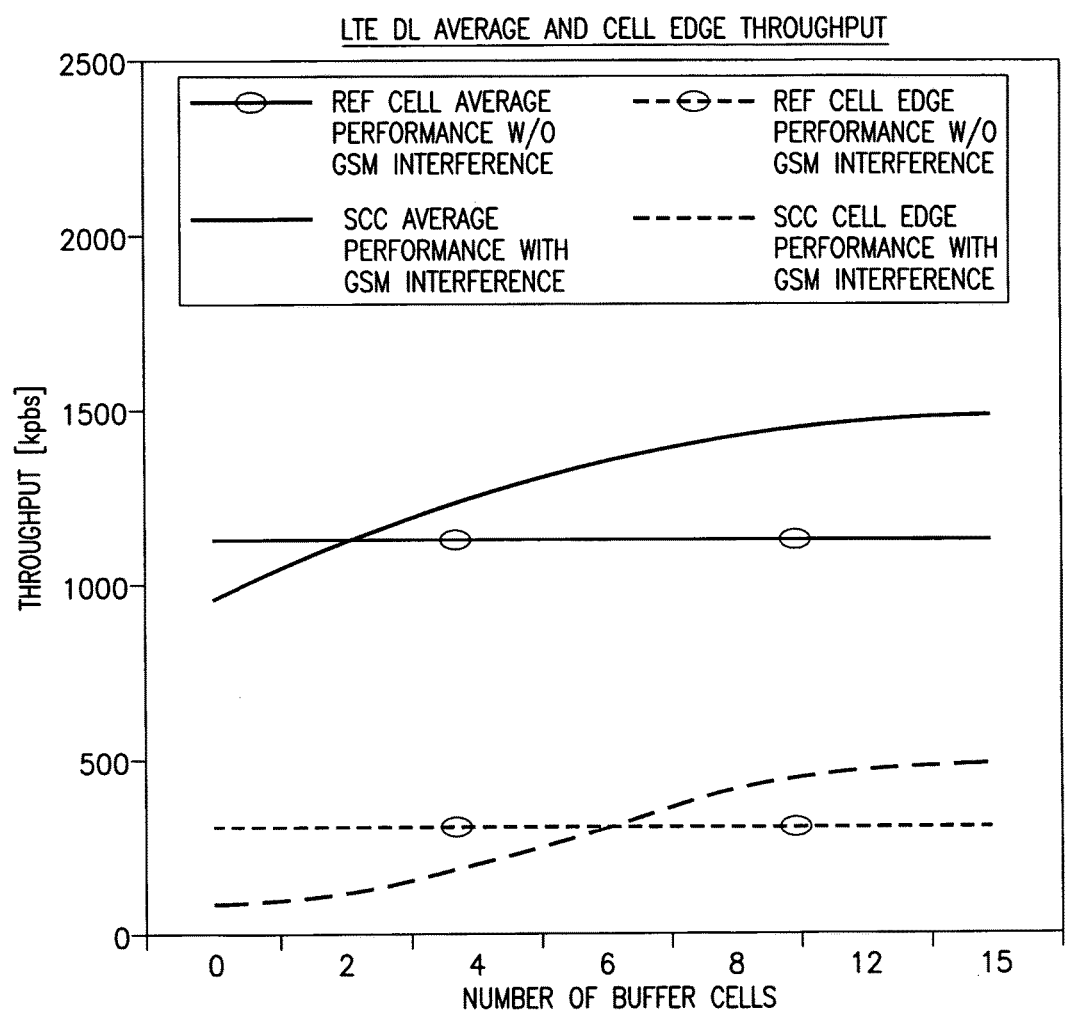
FIG. 2 illustrates an example LTE DL performance evaluation in a case of GSM co-channel interference.

In case of GSM and LTE spectrum sharing, the problem is that GSM interference may significantly change for the next burst (e.g. in case of frequency hopping) and therefore LTE scheduler can make allocation based on substantially 'wrong' interference estimations. High interference peaks may result in interference at a spectrum block that was previously free from GSM interference. These high interference peaks can be especially harmful to cell edge LTE users. This can be seen from the FIG. 2 where GSM interference impact on LTE cell average and cell edge performance was evaluated. FIG. 2 illustrates an example LTE DL performance evaluation in case of GSM co-channel interference from nearby cells (SCC=Secondary Component Carrier). Currently a large number of buffer cells are needed to keep LTE cell edge quality at a preferred level.

One simple method to avoid intersystem interference is to use isolation distance between different technologies operating on the same spectrum. In this case a disadvantage can be present in that there will be wide of buffer areas where spectrum can't be used at all. Typically isolation distances from 10 up to 50 km have been proposed for macro cells.

In a proposed use case there is GSM and LTE coexistence, i.e., there is intersystem interference between the technologies. Exemplary embodiments as discussed herein make LTE schedulers aware of the detailed frequency and time domain GSM resource usage (=outgoing interference) during traffic bursts for example. In prior art intersystem interference estimation is typically an average value. In GSM system there can be very high levels of time and frequency domain changes/peaks in the resource usage (=interference), as similarly described above.

In accordance with the exemplary embodiments there is provide future resource usage information from the first system to the second system so that the scheduler of the second system is aware of the coining resource usage in the spectrum where the first system is causing interference towards the second system.

In an exemplary embodiment of the invention, GSM frequency plan and frequency hopping pattern information is used to predict GSM interference for the next resource blocks, for example using 200 kHz resolution in a frequency domain and GSM TDMA bust resolution in a time domain. Using this information in LTE a scheduler can avoid high GSM interference peaks especially for the cell edge users, and/or select suitable modulation and coding (if required then spreading and scrambling can be added to channel coding too) to ensure preferred quality in case of known high GSM interference. Additionally, GSM channel allocation status, DTX and power control information have similar impact on outgoing GSM interference, so that all these variables can be included in the resource usage information. Resource usage (or interference information) can be processed in GSM side and provide results of that towards LTE. Exchange can be e.g. via LTE X2 interface or a connection between GSM BSC and LTE eNodeB (another embodiment can be implemented via RNC).

In an optimal case all available interference information may be used for scheduling such as: power level, time and frequency domain. This information is needed at least from connections which are interfering primary system most from signal detection point of view. In a simple and preferred form only interference free resources are informed to primary system scheduler. By summing neighbor interfering resources together it is possible to detect different level of interference free resources (e.g. all reports are interference free, part of interfering neighbors are reporting interference free resources). By resources it is meant time and frequency resources of interfering system but those can be mapped into primary system resources easily.

Then to limit a need for interference data transfer from other system only part of that information is transferred. One option is to transfer only interference free resources in time and frequency domain. By this way a primary system can build a view of other system interference levels. If TX power information is used then additional information (or estimates) such as regarding path loss and/or TX power measurement can be used.

As similarly described above a potential implementation can be used jointly with GSM-LTE DSR and the inter system interference estimation method as proposed. The following implementation description will focus on such a use case.

It is noted that a Base Station Controller (BSC) is responsible of resource allocation in the GSM system and has all information needed to identify time and frequency domain usage of the cell resources by the GSM system. Thus, by using this information to combine GSM frequency plans and frequency hopping it can be identified which timeslot-frequency pairs are not used in GSM. Then, by adding information from current resource allocation, i.e. which timeslots carry traffic at the moment, additional interference free timeslot-frequency combinations can be identified. Furthermore, power control information can be used to identify additional low interference level timeslot-frequency pairs.

Then, in accordance with the embodiments, an LTE cell specific interference map can be made indicating coming GSM interference. This can be sum of timeslot-frequency pairs from the cells which are causing interference to a specific LTE cell. In accordance with the embodiment identification of interfering cells are identified. In this manner, a network device such as an LTE scheduler can avoid allocating cell edge users, or some other special user group, to the resource blocks with known high GSM interference.

Figure 3:
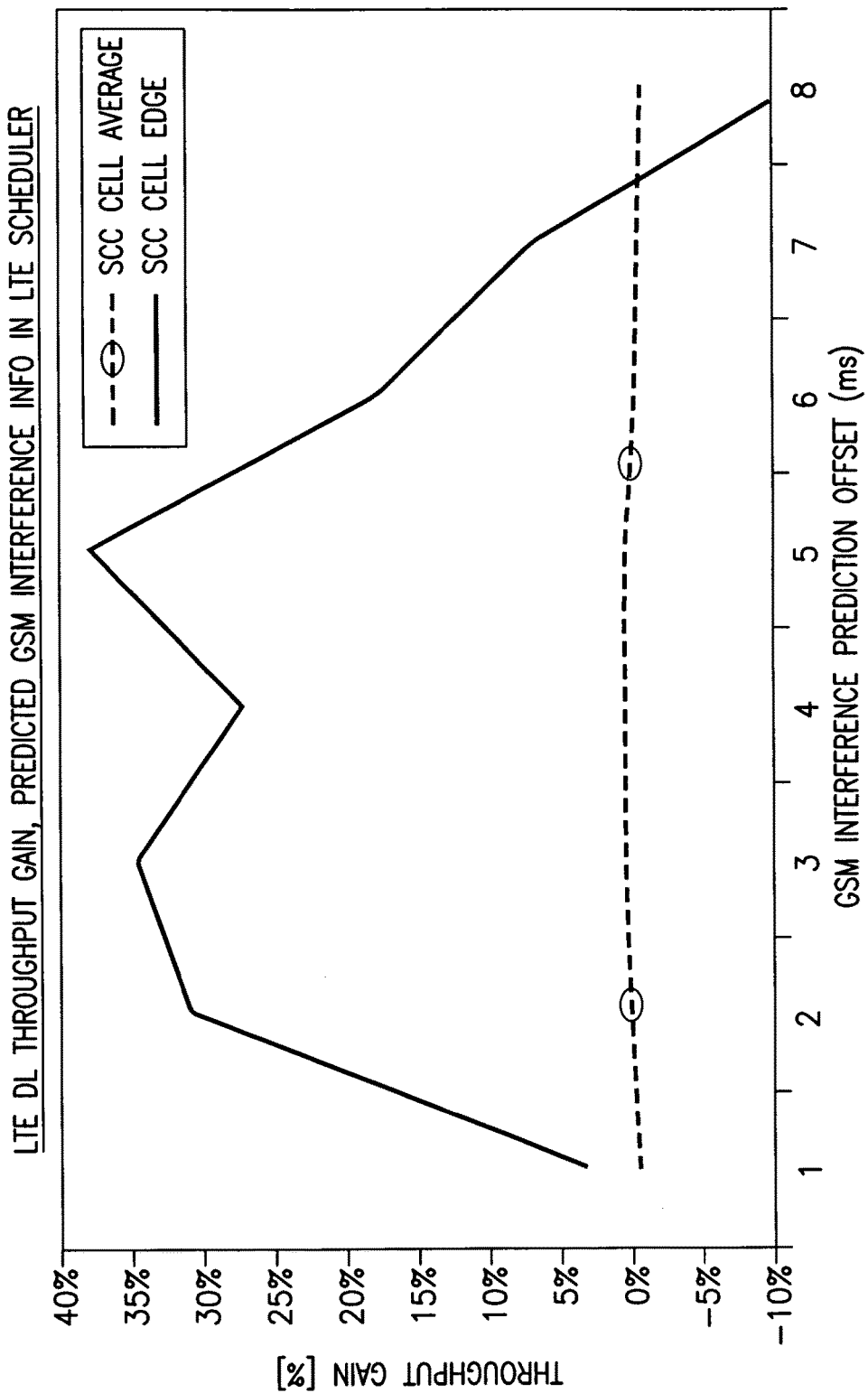
FIG. 3 illustrates LTE DL throughput gain with predicted interference information for an LTE scheduler in accordance with the exemplary embodiments of the invention.

FIG. 3 illustrates an example LTE DL performance evaluation in case of GSM co-channel interference. LTE scheduler is aware of GSM interference details in next bursts (SCC=Secondary Component Carrier). FIG. 3 illustrates example LTE DL performance results for the case when LTE scheduler is aware of coming GSM interference. It is shown that up to 35% capacity gain was achieved at the cell edge when GSM interference information is available in the LTE scheduler.

In addition it is assumed that LTE TDD operations as disclosed herein are behaving same way as with FDD DL. In addition to this interference information can be utilized for TDD UL scheduling in UE PRB allocation procedures or UE frequency hopping pattern.

Furthermore, if CoMP is used in system then the previously described methods can be utilized to select more suitable (.e.g. less interference in connection to UE) base station (including RRH) for wireless communication and optimize system performance by that way.

Another benefit when using the proposed methods is that also GSM will receive less interference from the LTE system, i.e., when LTE is avoiding frequencies that GSM is using, there is no outgoing LTE interference on those frequency blocks.

Figure 4:
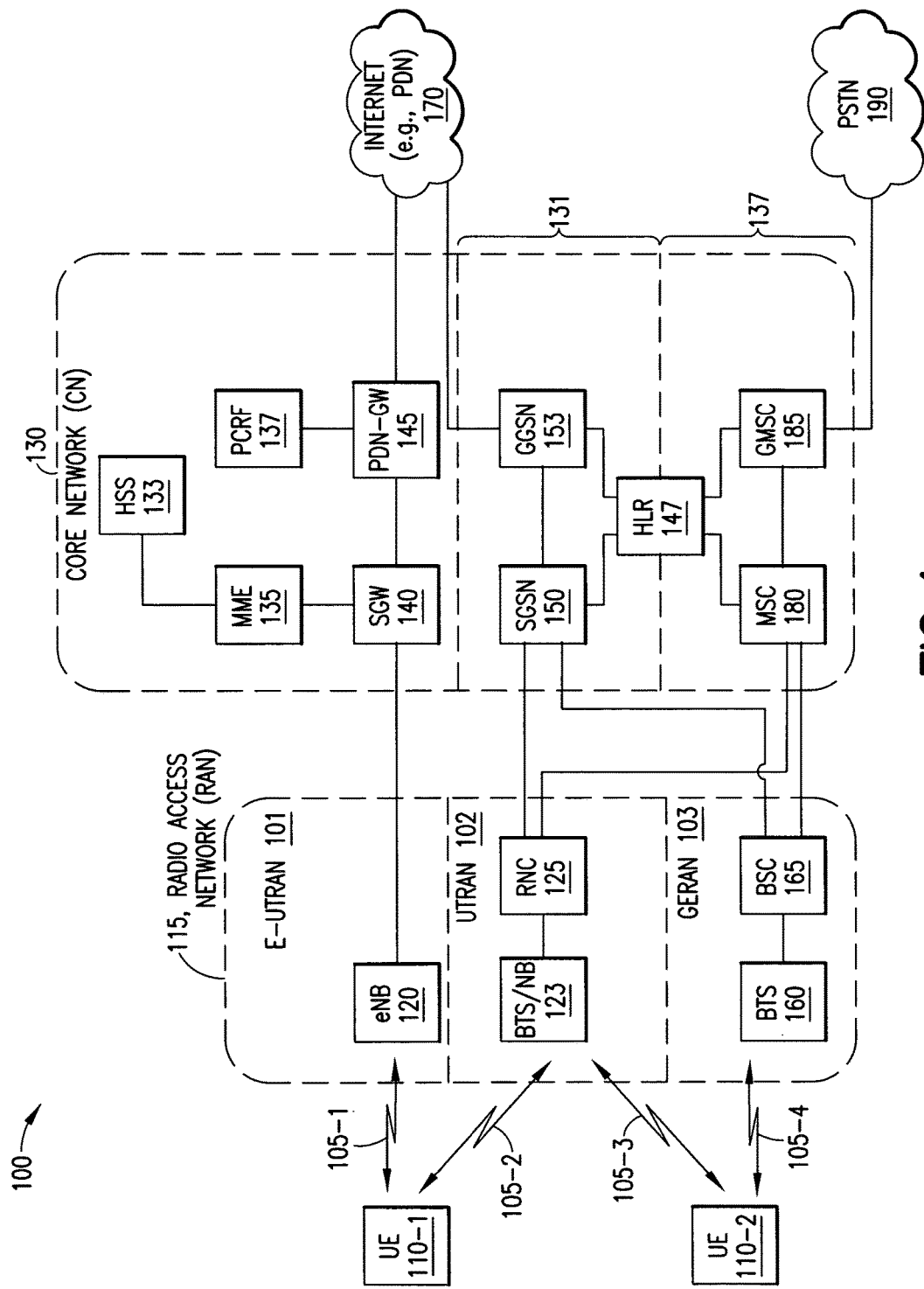
FIG. 4 illustrates a block diagram of an exemplary wireless network in which the exemplary embodiments may be practiced.

Reference is now made to FIG. 4 for illustrating a simplified block diagram of various electronic devices and apparatus that are suitable for use in practicing the exemplary embodiments of this invention. FIG. 4 illustrates three systems, each having different radio access technologies: E-UTRAN 101, UTRAN 102, and GERAN 103. Each of these systems is roughly divided into a radio access network (RAN) 115 and a core network (CN) 130. The exemplary embodiments of the invention may be used to the advantage of at least interference mapping and spectrum usage scheduling in these networks. For ease of explanation, the many connections between various entities in FIG. 4 are not discussed. Furthermore, the systems 101, 102, and 103 are merely representations for ease of exposition and are not to be construed as being limiting or exhaustive.

In an E-UTRAN embodiment, the RAN 115 includes an eNB (evolved Node B, also called E-UTRAN Node B) 120, and the CN 130 includes a home subscriber server (HSS) 133, a serving gateway (SGW) 140, a mobility management entity (MME) 135, a policy and charging rules function (PCRF) 137, and a packet data network gateway (PDN-GW) 145. E-UTRAN is also called long term evolution (LTE).

In a UTRAN embodiment, the RAN 115 includes a base transfer station (BTS) (Node B) 123, and a radio network controller 125, and the CN 130 includes a serving GPRS support node (SGSN) 150, a home location register (HLR) 147), and a gateway GPRS support node (GGSN) 153.

In a GERAN embodiment, the RAN 115 includes a BTS 160 and a base station controller (BSC) 165, and the CN 130 includes a mobile switching center (MSC) 180 and a gateway MSC (GMSC) 185. This example shows the HLR 147 as being part of both UTRAN and GERAN, but this is merely exemplary.

The GMSC 185 is connected to the PSTN 190. There is a circuit-switched core network (CS CN) 137, which includes the MSC 180 and the GMSC 185. Note that the RNC 125 of UTRAN and the BSC 165 of GERAN can both access the CS CN 137.

The PDN-GW 145 and the GGSN 153 connect to the Internet (or other packet data network) 170. There is a packet-switched core network (PS CN) 131, which includes the GGSN 153 and SGSN 150. Both the RNC 125 of UTRAN and the BSC 165 of GERAN can access the PS CN 131.

The example of FIG. 4 shows a UE 110-1 that is able to connect to both the E-UTRAN 101 and the UTRAN 102 via wireless links 105-1 and 105-2, respectively. UE 110-2 can connect to the UTRAN 102 and to the GERAN 103 via wireless links 105-3 and 105-4, respectively. Exemplary embodiments related to at least interference mapping and spectrum usage scheduling as described herein may also apply to handovers from E-UTRAN 101 to UTRAN 102 and vice versa. The exemplary embodiments of the invention may be used to the advantage to optimize link and/or network performance over available links for UE 110-1 and/or UE 110-2.

Figure 5:
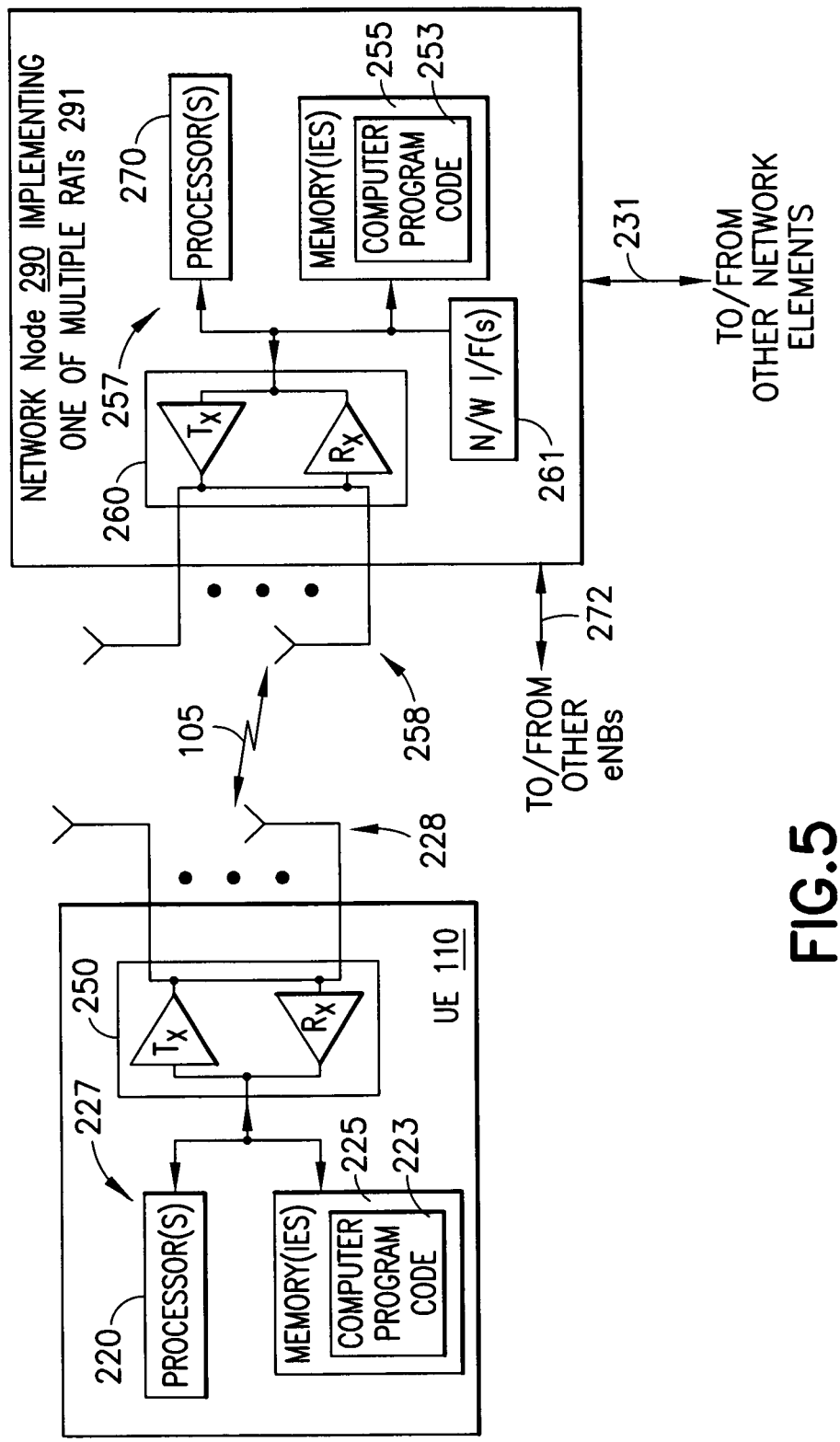
FIG. 5 is a block diagram of a portion of the wireless network shown in FIG. 4.

Turning to FIG. 5, this figure shows a block diagram a portion of the wireless system 100. In FIG. 5, a UE 110 is in wireless communication via a wireless link 105 with a network node 290 of wireless network 100. The user equipment 110 includes one or more processors 220, one or more memories 225, and one or more transceivers 250 interconnected through one or more buses 227. The one or more transceivers 250 are connected to one or more antennas 228. The one or more memories 225 include computer program code 223. The one or more memories 225 and the computer program code 223 are configured to cause, with the one or more processors 220, the user equipment 210 to perform one or more of the operations as described herein.

The network node 290 may be one of the RAN network nodes in the RAN 115 for the various systems E-UTRAN 101, UTRAN 102, GERAN 103, and may implement one or more RATs corresponding to an appropriate system 101, 102, or 103. A RAT is a means for a UE to access a wireless network and includes appropriate air interfaces (e.g., spectrums, coding, channels, spreading, physical resources in time, frequency, or codes) for LTE, UMTS, GSM, CDMA, and the like. The network node 290 includes one or more processors 270, one or more memories 255, one or more network interfaces (N/W I/F(s)) 261, and one or more transceivers 260 interconnected through one or more buses 257. The one or more transceivers 260 are connected to one or more antennas 258. The one or more memories 255 include computer program code 253. The one or more memories 255 and the computer program code 253 are configured to, with the one or more processors 250, to cause the network node 290 to perform one or more of the operations as described herein. The one or more network interfaces 261 communicate over a network such as the networks 272 and 231. Two or more base stations communicate using, e.g., network 270. The network 272 may be wired or wireless or both. The network 231 may be wired or wireless or both may be used to communicate with other network elements.

The computer readable memories 225 and 255 may be of any type suitable to the local technical environment and may be implemented using any suitable data storage technology, such as semiconductor based memory devices, flash memory, magnetic memory devices and systems, optical memory devices and systems, fixed memory and removable memory. The processors 220 and 270 may be of any type suitable to the local technical environment, and may include one or more of general purpose computers, special purpose computers, microprocessors, digital signal processors (DSPs) and processors based on multi-core processor architecture, as non-limiting examples.

In accordance with the exemplary embodiments of the invention the novel operations may be performed using relates a network device such as, but not limited to, a base station, for example the eNB 120 of FIG. 4 or network node 290 of FIG. 5. Further, in regards to the exemplary aspects such as related to sending the information for at least the interference mapping and/or scheduling may be performed using any of user equipment such as in FIG. 4 or FIG. 5, and/or another network device such as for example BTS 160 and/or BTS 123 of the core network 130 as in FIG. 4.

In accordance with the exemplary embodiments there is receiving, by a network device, information comprising a frequency and time of resources available for a cell of a neighboring cell.

In accordance with the exemplary embodiments of the invention as in the paragraph above there is processing the received frequency and time resources to create a cell specific mapping of time-frequency pairs not used by the neighboring cell.

In accordance with the exemplary embodiments of the invention as in the paragraphs above where the received information comprises indications of only interference free frequency and time resources available for the cell of the neighboring cell.

In accordance with the exemplary embodiments of the invention as in the paragraphs above wherein the indications of the interference free frequency and time resources available for the cell of the neighboring cell are only for a predetermined amount of next bursts scheduled.

In accordance with the exemplary embodiments of the invention as in the paragraphs above wherein the processing comprises adding current resource allocation information associated with the network device to the mapping.

In accordance with the exemplary embodiments of the invention as in the paragraphs above wherein the processing comprises summing the mapped time-frequency pairs.

In accordance with the exemplary embodiments of the invention as in the paragraphs above the mapping comprises information identifying low interference level time-frequency pairs.

In accordance with the exemplary embodiments of the invention as in the paragraphs above wherein the identifying low interference level time-frequency pairs is using a threshold.

In accordance with the exemplary embodiments of the invention as in the paragraphs above the identifying is using power control information.

In accordance with the exemplary embodiments of the invention as in the paragraphs above wherein the neighboring cell comprises a secondary component carrier system In accordance with the exemplary embodiments of the invention as in the paragraphs above wherein the neighboring cell comprises a global system for mobile communications.

In accordance with the exemplary embodiments of the invention as in the paragraphs above wherein the network device is associated with a long term evolution communication system.

In accordance with the exemplary embodiments of the invention as in the paragraphs above wherein the cell specific mapping is used to allocate physical resource blocks for user equipment uplink signalling.

In accordance with the exemplary embodiments of the invention as in the paragraphs above wherein the allocating is for a cell edge or other cell position wherein the allocating provides a link and/or system performance gain to the user equipment.

In accordance with the exemplary embodiments of the invention as in the paragraphs above there is using the cell specific mapping to schedule a user equipment frequency hopping pattern.

In accordance with the exemplary embodiments of the invention as in the paragraphs above wherein the network device comprises a base station controller.

In accordance with the exemplary embodiments of the invention as in the paragraphs above wherein the received information comprising the frequency and time of the available resources is received from at least one of the neighboring cell and user equipment.

An apparatus comprising at least one processor and at least one memory including computer program code, wherein the at least one memory and the computer code are configured with the at least one processor, to cause the apparatus to at least perform the any of the methods disclosed herein can serve as an embodiment of this invention.

Figure 6:
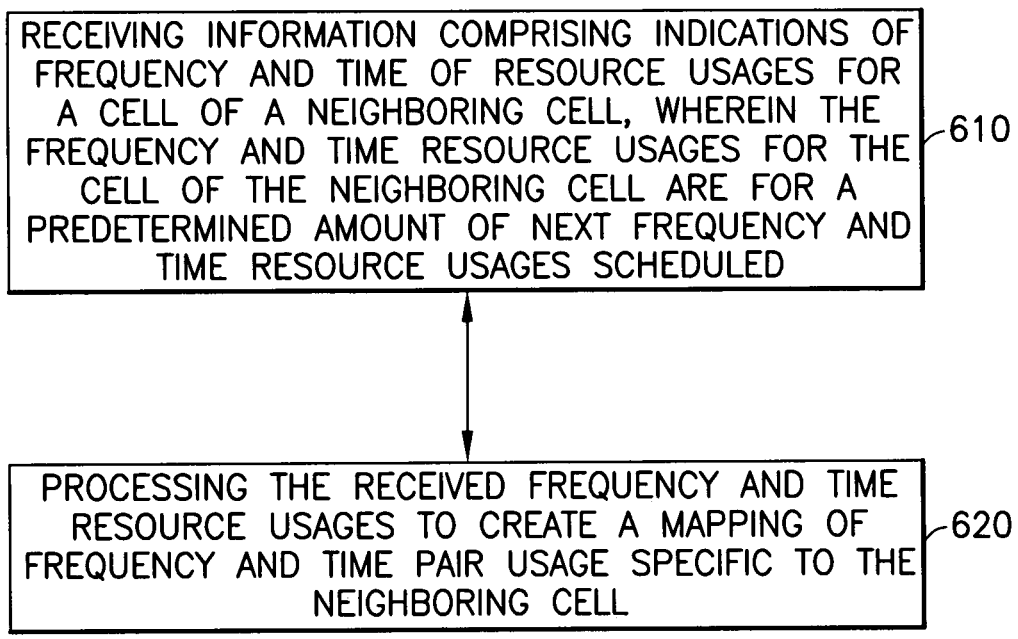
FIG. 6 shows a method in accordance with the exemplary embodiments which may be performed by an apparatus.

FIG. 6 illustrates operations which may be performed by a network device such as, but not limited to, a carrier select device (e.g., eNB 120 of FIG. 4 or network node 290 of FIG. 5). As shown in step 610 as shown in FIG. 6, there is receiving information comprising indications of frequency and time of resource usages for a cell of a neighboring cell, wherein the frequency and time resource usages for the cell of the neighboring cell are for a predetermined amount of next frequency and time resource usages scheduled. Then at step 620 as shown in FIG. 6 there is processing the received frequency and time resource usages to create a mapping of frequency and time pair usage specific to the neighboring cell.

In accordance with the exemplary embodiments as described in the paragraph above, the processing comprises associating current resource allocation information to the mapping to identify low interference frequency and time pairs for the resource allocation.

In accordance with the exemplary embodiments as described in the paragraphs above, the identifying low interference level frequency and time resource usage is using a threshold.

In accordance with the exemplary embodiments as described in the paragraphs above, the identifying is using power control information associated with the frequency and time resource usage pairs.

In accordance with the exemplary embodiments as described in the paragraphs above, the neighboring cell comprises a global system for mobile communications, and wherein the network device is associated with a long term evolution communication system.

In accordance with the exemplary embodiments as described in the paragraphs above, there is sending an indication of the cell specific mapping towards user equipment to allocate physical resource blocks for uplink signalling by the user equipment.

In accordance with the exemplary embodiments as described in the paragraphs above, the allocating is for a cell edge or other cell position wherein the allocating provides at least one of a link and system performance gain to the user equipment.

In accordance with the exemplary embodiments as described in the paragraphs above, the received information comprising the indications of frequency and time of resource usages is received from a user equipment.

In accordance with the exemplary embodiments as described in the paragraphs above, the network device comprises a base station controller.

In the exemplary aspect of the invention according to the paragraph above, wherein the means for receiving and processing comprises a non-transitory computer readable medium [[N/W I/F(s) 261] and [Memory 255]] encoded with a computer program code [Computer Program Code 253] executable by at least one processor [Processors(s) 270].

The apparatus may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which, when the program is run, are configured to carry out embodiments described above by means of FIG. 6. Additionally, software routines may be downloaded into the apparatus.

The apparatus, such as a node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A computer program product embodied on a non-transitory computer-readable medium, in which a computer program is stored which, when being executed by a computer, is configured to provide instructions to control or carry out any of the methods disclosed herein can also serve as an embodiment of this invention.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   receive information comprising indications of frequency and time of resource usages for a cell of a neighboring cell, wherein the frequency and time resource usages for the cell of the neighboring cell are for a predetermined amount of next frequency and time resource usages scheduled for the cell; and process the received frequency and time resource usages to create a mapping of frequency and time pair usage specific to the neighboring cell, wherein the processing comprises associating current resource allocation information to the mapping to identify low interference frequency and time resource usage pairs for the resource allocation.

2. The apparatus of claim 1, wherein identifying the low interference level frequency and time resource usage pairs is using a threshold.

3. The apparatus of claim 1, wherein the identifying is using power control information associated with the frequency and time resource usage pairs.

4. The apparatus of claim 1, wherein the neighboring cell comprises a global system for mobile communications, and wherein the apparatus is associated with a long term evolution communication system.

5. The apparatus of claim 1, wherein the at least one memory including the computer program code is configured with the at least one processor to send an indication of the cell specific mapping towards user equipment to allocate physical resource blocks for uplink signalling by the user equipment.

6. The apparatus of claim 5, wherein the allocating is for a cell edge or other cell position wherein the allocating provides at least one of a link and system performance gain to the user equipment.

7. The apparatus of claim 1, wherein the received information comprising the indications of frequency and time of resource usages is received from a user equipment.

8. The apparatus of claim 1, wherein the apparatus comprises a base station controller.

9. A method comprising:

receiving, by a network device, information comprising indications of frequency and time of resource usages for a cell of a neighboring cell, wherein the frequency and time resource usages for the cell of the neighboring cell are for a predetermined amount of next frequency and time resource usages scheduled; and processing the received frequency and time resource usages to create a mapping of frequency and time pair usage specific to the neighboring cell, wherein the processing comprises associating current resource allocation information to the mapping to identify low interference frequency and time pairs for the resource allocation.

10. The method of claim 9, wherein the identifying low interference level frequency and time resource usage is using a threshold.

11. The method of claim 9, wherein the identifying is using power control information associated with the frequency and time resource usage pairs.

12. The method of claim 9, wherein the neighboring cell comprises a global system for mobile communications, and wherein the network device is associated with a long term evolution communication system.

13. The method of claim 9, comprising sending an indication of the cell specific mapping towards user equipment to allocate physical resource blocks for uplink signalling by the user equipment.

14. The method of claim 13, wherein the allocating is for a cell edge or other cell position wherein the allocating provides at least one of a link and system performance gain to the user equipment.

15. The method of claim 9, wherein the received information comprising the indications of frequency and time of resource usages is received from a user equipment.

16. The method of claim 9, wherein the network device comprises a base station controller.

17. A non-transitory computer readable medium including computer code, the computer code executed by at least one processor to perform the method of claim 9.

\* \* \* \* \*